(12) United States Patent
Sundholm (10) Patent No.: US 11,180,315 B2
(45) Date of Patent: Nov. 23, 2021

(54) METHOD IN A FEED-IN STATION AND INPUT POINT ARRANGEMENT

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 0 days.

(21) Appl. No.: 17/041,288

(22) PCT Filed: Apr. 8, 2019

(86) PCT No.: PCT/FI2019/050283
§ 371 (c)(1),
(2) Date: Sep. 24, 2020

(87) PCT Pub. No.: WO2019/202204
PCT Pub. Date: Oct. 24, 2019

(65) Prior Publication Data
US 2021/0114804 A1    Apr. 22, 2021

(30) Foreign Application Priority Data

Apr. 17, 2018 (FI) ...................................... 20185364

(51) Int. Cl.
*B65F 1/00* (2006.01)
*B65F 1/10* (2006.01)
(Continued)

(52) U.S. Cl.
CPC .............. *B65F 1/0053* (2013.01); *B65F 1/10* (2013.01); *B65G 53/46* (2013.01); *B65G 53/66* (2013.01);
(Continued)

(58) Field of Classification Search
CPC .............. B65F 1/0053; B65F 2210/138; B65F 2210/144; G08B 21/182
(Continued)

(56) References Cited

U.S. PATENT DOCUMENTS 9,352,887 B2* 5/2016 Poss ....................... B65D 55/00
2009/0126473 A1* 5/2009 Porat ....................... G01F 23/00
73/149

FOREIGN PATENT DOCUMENTS

EP    2851318 A1    3/2015
GB    2496634 A    5/2013
(Continued)

OTHER PUBLICATIONS

International Search Report, issued in PCT/FI2019/050283, PCT/ISA/210, dated Jun. 27, 2019.
(Continued)

*Primary Examiner* — John A Tweel, Jr.
(74) *Attorney, Agent, or Firm* — Birch, Stewart, Kolasch & Birch, LLP (57) ABSTRACT

In a method for guiding and/or instructing in a feed-in station of a material conveying system, the feed-in station includes at least one first input point and at least one second input point, which input points each include at least one input aperture and a shut-off part of the input aperture, which shut-off part is movable between a first position in which the input aperture is at least partly closed, in which case material is not intended to be fed from the input aperture to inside the input point, and a second position in which the input aperture is open, in which second position material can be fed from the input aperture to inside the input point. The first input point and/or the second input point is adapted to include an indicator and/or signal, with which in the method a user is guided and/or instructed to feed in material from the input aperture of the second input point of the feed-in station, when the first input point is in a state in which it cannot receive material. An input point arrangement is used in the method.

30 Claims, 2 Drawing Sheets

(51) Int. Cl.
   *G08B 21/18* (2006.01)
   *B65G 53/46* (2006.01)
   *B65G 53/66* (2006.01)
   *G06Q 90/00* (2006.01)
   *G08B 21/00* (2006.01)

(52) U.S. Cl.
   CPC ............. *G06Q 90/20* (2013.01); *G08B 21/00* (2013.01); *G08B 21/182* (2013.01); *B65F 2210/138* (2013.01); *B65F 2210/144* (2013.01)

(58) Field of Classification Search
   USPC .......................................................... 340/540
   See application file for complete search history.

(56) References Cited

FOREIGN PATENT DOCUMENTS

| KR | 10-2010-0109702 A | 10/2010 |
|---|---|---|
| WO | WO 03/011717 A2 | 2/2003 |
| WO | WO 2015/015054 A1 | 2/2015 |

OTHER PUBLICATIONS

Written Opinion of the International Searching Authority, issued in PCT/FI2019/050283, PCT/ISA/237, dated Jun. 27, 2019.

\* cited by examiner

FIG 1

METHOD IN A FEED-IN STATION AND INPUT POINT ARRANGEMENT

FIELD OF THE INVENTION

The object of the invention is a method as defined in the preamble of claim 1.

The object of the invention is also an input point arrangement as defined in the preamble of claim 15.

BACKGROUND OF THE INVENTION

The invention relates generally to material conveying systems, such as to pneumatic partial-vacuum transporting systems, more particularly to the collection and conveying of wastes, such as to the conveying of household wastes or recyclable material. The invention also relates to waste feeding means, such as to input points or refuse chutes, with which waste is conveyed, typically by gravity, e.g. from higher input apertures in residential buildings to a lower collection space or corresponding container.

Systems wherein wastes are conveyed in piping by means of a pressure difference or suction are known in the art. In these, wastes are conveyed long distances in the piping by sucking. It is typical to these systems that a partial-vacuum apparatus is used to bring about a pressure difference, in which apparatus negative pressure is brought about in the conveying pipe with partial-vacuum generators, such as with a fan, with vacuum pumps or with an ejector apparatus. A conveying pipe typically comprises at least one valve means, by opening and closing which the replacement air coming into the conveying pipe is regulated. Waste input points, e.g. rubbish containers or refuse chutes, are used in the systems at the waste material input end, into which waste input points material, such as waste material or recyclable material, is fed and from which waste input points the material to be conveyed is conveyed into a conveying pipe by opening a discharge valve means, in which case, by means of the suction effect brought about by means of the partial vacuum acting in the conveying pipe and also by means of the surrounding air pressure acting via the refuse chute, material such as e.g. waste material packed into bags, is conveyed from the refuse chute into the conveying pipe and onwards to a reception point, where the material being transported is separated from the transporting air and conveyed for further processing or e.g. into a shipping container. The pneumatic waste-conveying systems in question can be utilized particularly well in densely populated urban areas. In these types of areas, the feeding in of wastes into a pneumatic conveying system for the wastes is performed in feed-in stations, which can comprise a number of separate input points, e.g. categorized according to the types of material. A feed-in station can comprise e.g. one or more input points for mixed waste, biowaste, paper or cardboard. Specification WO2015/015054A1 presents a feed-in station wherein a number of input points are applied in connection with a pneumatic material conveying system.

Material can be conducted from an input point of a feed-in station along a refuse chute into a container that is lower in the vertical direction, or an intermediate container can be in connection with the input points, into which intermediate container material fed from an input point is initially conducted and from where the waste material is conveyed onwards along the conveying piping to a reception point.

Waste or recyclable material intended for conveying can be very different in terms of its volume. Different categories of waste therefore set requirements for the input points of waste input stations. Categories of material that take up a lot of space can require many input points, and intermediate containers possibly connected to them. Sometimes it can happen that when a user brings to a feed-in station, comprising a number of input points, material intended to be fed into the system, the primary input point for the type of material in question cannot receive more waste. In such a case the user does not necessarily place the material he/she brought into the secondary waste input point, but instead leaves the waste bag or recyclable material outside the input point of the feed-in station. This can cause, inter alia, hygiene problems and untidiness in the streetscape.

The aim of the present invention is to provide a completely new type of solution in connection with the input points for the feed-in stations of a wastes conveying system, by means of which solution the drawbacks of prior art solutions are avoided. One aim of the invention is to provide a solution with which the capacity of a feed-in station can be utilized more efficiently than earlier.

BRIEF DESCRIPTION OF THE INVENTION

The invention is based on a concept wherein the indication means and/or signal means of a first and/or second input point in an input point arrangement guides the user to bring material to the second input point, when the first input point is in a state in which it cannot receive material.

The method according to the invention is mainly characterized by what is stated in claim 1.

The method according to the invention is also characterized by what is stated in claims 2-14.

The input point arrangement according to the invention is mainly characterized by what is stated in claim 15.

The apparatus according to the invention is also characterized by what is stated in claims 16-29.

The system according to the invention is characterized by what is stated in claim 30.

The solution according to the invention has a number of important advantages. When the input point arrangement comprises indication means and/or signal means instructing and/or guiding a user, more efficient operation of the input point arrangement of a feed-in station than before is achieved. In addition, the operation of users bringing material is facilitated because the arrangement automatically guides a user to the next suitable input point. When the arrangement comprises indicator means and/or signal means of a first input point and/or second input point, an effective guidance effect and instruction effect is achieved. By using the shut-off part as an indicator means and/or signal means, the instruction effect can also be made clearer. By using supervision means, e.g. a sensor, to give information or a signal, e.g. about the filling of the material space of an input point, to the indicator means and/or signal means, instruction of a user can be effectively achieved. This is suitable to be used for both manually-operated and actuator-operated input points. With the release from locking of the shut-off part of the second input point, brought about on the basis of operation of the activation means of the first input point, and/or with its displacement into a second position, the indicator effect and/or signal effect can be further facilitated and thus also achievement of the guidance and instruction effect. Furthermore, the function in question can make it easier for a user to feed material into a second input point because then activation of the second input point is no longer needed after it has occurred from the first input point. The invention is well suited for use in conjunction with waste conveying systems.

According to the invention, input points, which are the input points of waste, such as waste receptacles or refuse chutes, can be used for feeding in material. The method and apparatus according to the invention are particularly well suited in connection with conveying systems of waste material, such as waste material and recyclable material arranged in bags.

BRIEF DESCRIPTION OF THE FIGURES

In the following, the invention will be described in more detail by the aid of an embodiment with reference to the attached drawings, wherein.

DETAILED DESCRIPTION OF THE INVENTION

Figure 1:
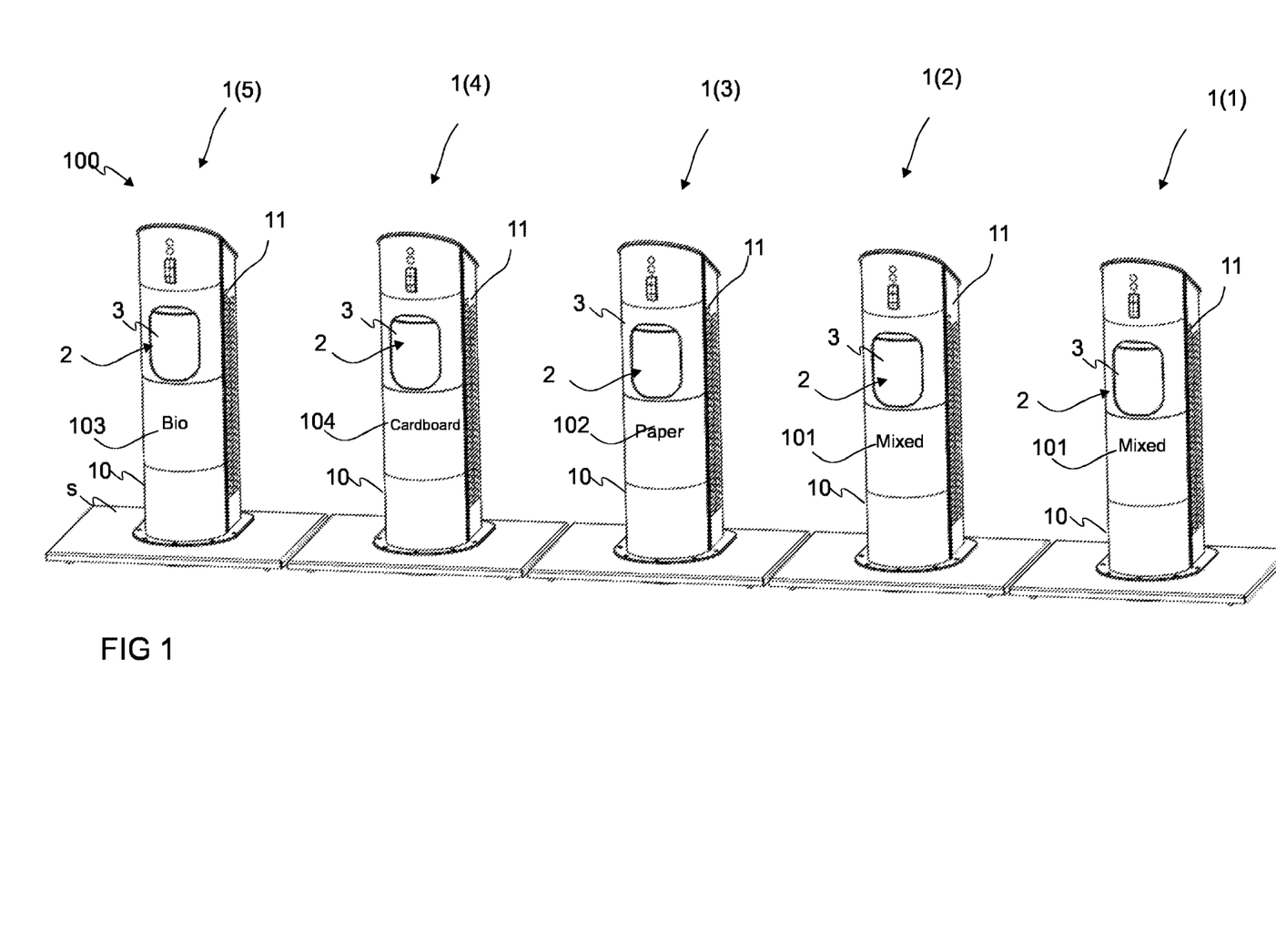
FIG. 1 presents one simplified embodiment of an apparatus according to the invention.
Figures 2, 2A, 2B:
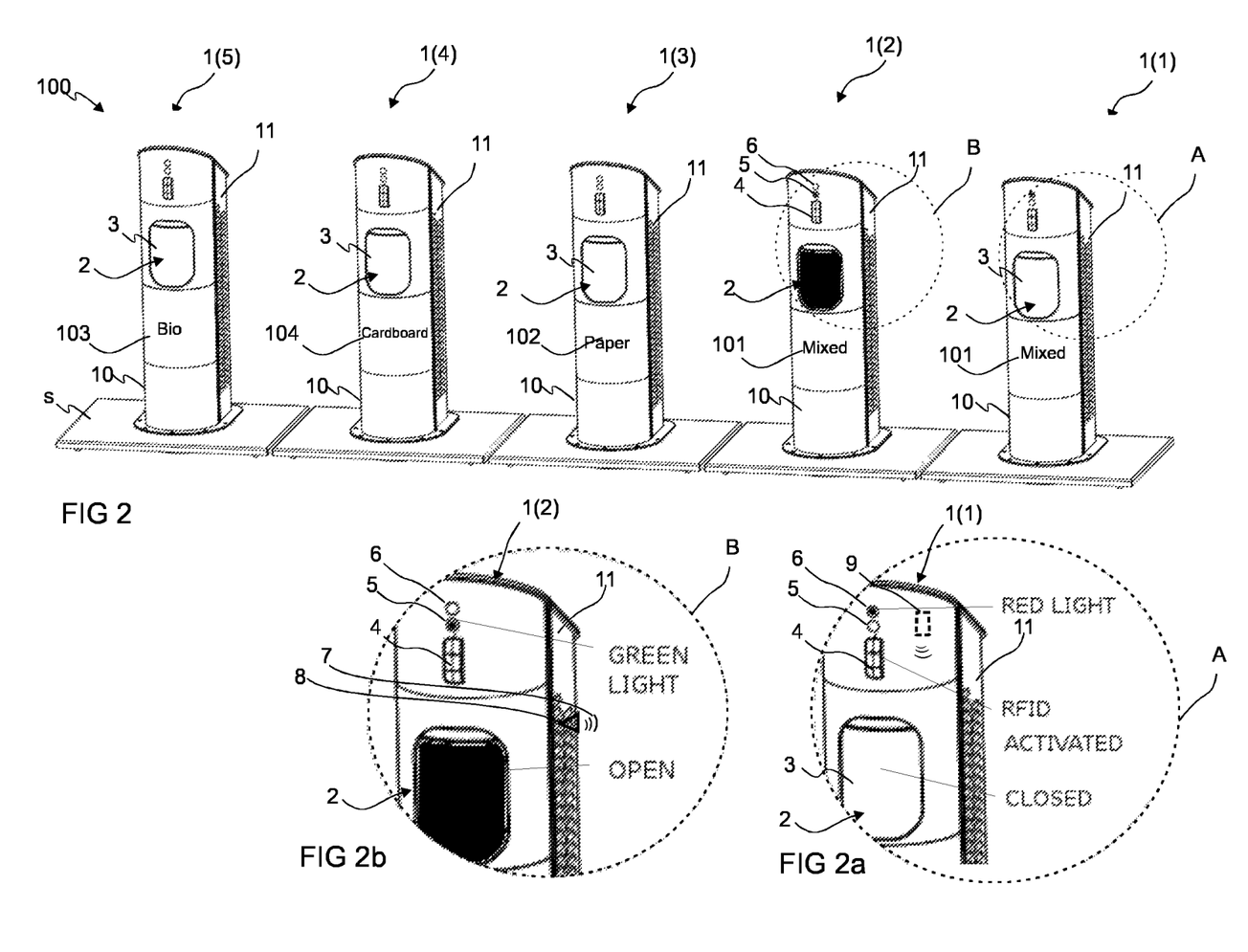
FIG. 2 presents one simplified embodiment of an apparatus according to the invention, in a second operating state.
FIG. 2a presents a detail A of FIG. 2.
FIG. 2b presents a detail B of FIG. 2.

FIGS. 1-2, 2a and 2b present a simplified input point arrangement according to the invention. The input point arrangement typically comprises at least one feed-in station 100, which comprises a number of input points 1(1), 1(2), 1(3), 1(4), 1(5), . . . 1(n). FIGS. 1-2 present a feed-in station 100 comprising at least two input points, at least one first input point 1(1) and one second input point 1(2). In the embodiment of FIGS. 1-2, the feed-in station 100 comprises five input points 1(1), 1(2), 1(3), 1(4), 1(5). The input points can typically be arranged for a number of different categories of material. Depending on the application site, there can be more or fewer input points in the feed-in station than are presented in FIGS. 1 and 2. Also there can be a higher or lower number of material categories intended for feeding into the input points of the feed-in station 100 than the number presented. The input points intended for different material categories are marked in the figures with the different reference numbers 101, 102, 103, 104. The material categories are also marked on the input points 1(1), 1(2), 1(3), 1(4), 1(5) in the embodiment of FIG. 1. One material category is mixed, mixed waste, at least one input point intended for which is marked with the reference number 101. A second material category is paper, at least one input point intended for which is marked with the reference number 102. A third material category is bio, biowaste, at least one input point intended for which is marked with the reference number 103. A fourth material category is carton, cardboard, at least one input point intended for which is marked with the reference number 104. In the embodiments of the figures, an identifier of the material category intended to be fed into an input point can be marked on the wall 11 of the envelope of each input point. In the embodiment of the figures, the designation of the material category is written on the envelope of the input point. Depending on the application site, there can also be other material categories, e.g. plastic, glass, metal, et cetera. In each input point 1(1), 1(2), 1(3), 1(4), 1(5) . . . 1(n) of a feed-in station is an input aperture 2 for feeding material, such as waste material or recyclable material, into a feed-in container 10 arranged inside the envelope of the input point. In some cases, an input point is connected to a material container (not presented), which could be arranged below the level of the mounting surface s of the input point, e.g. at the point of the input point. In some other case also, an input point can be connected to a material conveying pipe of a pneumatic material conveying system, e.g. via an intermediate container, in which pipe the material is conveyed along with the pressure difference and/or flow of conveying air brought about by means of the operating means of the pneumatic material conveying system into a reception point (not presented). One pneumatic material conveying system is disclosed in specification WO2015/015054A1.

In the embodiment of FIG. 1-2, a shut-off part 3, such as an opening or closing hatch or corresponding, can be arranged in connection with the input aperture 2 of an input point 1(1), 1(2), 1(3), 1(4), 1(5), . . . 1(n). In the first position of the shut-off part 3 of the input aperture 2, such as when the hatch is closed, the shut-off part can cover at least a part of the input aperture 2 and prevent the feeding in of material via the input aperture 2 into a container space 10 inside the envelope 11 of the input point. In the second position of the shut-off part 3, such as a hatch, when the input aperture 2 is open, material can be fed in via the input aperture 2 into a container space 10 inside the envelope 11 of the input point. The shut-off part 3 of an input aperture 2 is arranged to be operated e.g. by an actuator (not presented) with which the shut-off part 3 is arranged in a manner that allows it to be moved between at least two positions, a first position, in which it covers at least a part of the input aperture 2, and a second position, in which the input aperture 2 is open. The shut-off part can be manually operated or actuator driven.

An operating arrangement can be arranged in connection with an input point 1(1), 1(2), 1(3), 1(4), 1(5), . . . 1(n), in which arrangement of a shut-off part 3, or the locking device of it, can be arranged to open, e.g. with a key, with a code entered by a user, with a remotely-readable identifier, or with a command sent via a mobile device. The shut-off part can be arranged to open by a manual user action, e.g. with an operating switch and/or a lever. In the operating arrangement, an activation means can be arranged in an input point 1(1), 1(2), 1(3), 1(4), 1(5) . . . 1(n). In the figure, the activation means can be arranged to describe generally the opening apparatus and/or locking apparatus of a shut-off part, or a part of them. The activation means 4 can be e.g. a switch, lock, code input panel, reader of a remotely-readable identifier, or receiver of a signal sent with a mobile device. The activation means 4 can be a part of an apparatus that is adapted to displace the shut-off part 3 into a different state, e.g. by giving a command to the actuator and/or locking device of the shut-off part 3. In this case, in the second state the shut-off part displaces, or is displaceable, from the first position into the second position in such a way that the input aperture 2 of the input point can be opened for feeding in material. A remotely-readable identifier can be e.g. an RFID identifier on the person of the user or an identifier fitted into the material to be fed in or into a bag or sack filled with material.

When an input point 1(1), 1(2), 1(3), 1(4), 1(5), . . . 1(n) of a feed-in station 100 is in a state in which material can be received, the shut-off part 3 of the input aperture can therefore be released to displace into a second state, i.e. can open, when the user performs the necessary action for opening the shut-off means. Such an action can be an action directed at the activation means 4, e.g. the pressing of an operating switch, the locking (and possibly necessary opening movement) of a key, the taking of the reader of a remotely-readable identifier into reading range, the input of a code, or the sending of a command with a mobile device. It can be conceived that, in some embodiments, the shut-off part 3 can be a manually openable and closable hatch.

At least one first input point 1(1) and/or at least one second input point 1(2) can comprise indicator means and/or signal means for guiding a user. According to one embodiment, the indicator means and/or signal means can be at least one light source 5, 6 arranged in an input point or in the proximity of it. The light source 5, 6 can, in one embodiment, be e.g. a LED light source. A light source 5, 6 can be adapted to give to a user information about the state of an input point and/or catch a user's attention and/or guide a user. An indicator means and/or signal means can be a display that can be adapted to give to a user information about the state of an input point and/or catch a user's attention and/or guide a user. An indicator means and/or signal means can be sound source 8 that can be adapted to give a sound signal 8 and/or information to a user, e.g. information to a user about the state of an input point 1(1), 1(2), 1(3), 1(4), 1(5), and/or to catch the attention of a user and/or to guide a user. According to one embodiment, the opening or closing shut-off means 3 of at least one first input point 1(1) and/or second input point 1(2) can be an indicator means and/or signal means. According to one embodiment, different indicator means and/or signal means are described in simplified form in FIGS. 2a and 2b. There can be fewer or more indicator means and/or signal means than presented in the figures. The features of an input point possibly presented with one another can, if necessary, also be used separately to each other.

According to one embodiment, when the indicator means and/or signal means is a light source 5, 6, by means of the light source the state of the first and/or second input point can be indicated and/or the attention of a user can be caught and/or a user can be guided. By means of the light source 5, 6, the state of an input point can be indicated and/or the attention of a user can be caught and/or a user can be guided in different ways. The different ways of indicating the state of an input point and/or of catching a user's attention and/or of guiding a user are e.g.: a light is shown with a light source by activating the light source, a light is not shown, a light source is activated to flash a light, a light source is activated to show a first color, a light source is activated to show a second color. The ways presented can, in some embodiments, be combined with each other. In the embodiment of FIGS. 2a, 2b, one or more light sources 5, 6 can be used. In the situation of FIG. 2a the first input point 1(1) cannot receive more material, in which case the first light source 6 is switched into an operating state in which it is adapted to indicate the state of the input point (e.g. that the input point is in a state in which it cannot receive material), this can occur e.g. by showing a red light.

An input point and/or a material space connecting to it can comprise a supervision means 9 (diagrammatically presented in FIG. 2a), e.g. a sensor. The supervision means can be adapted to monitor the amount of material fed into the input point and/or into the material space connected to it. The supervision means 9 can be e.g. a sensor monitoring the surface height of the amount of material of the input point and/or of the material space connected to said input point. The supervision means 9 can be e.g. an ultrasound sensor. According to one embodiment, the supervision means 9 is a limit switch. When the amount of material of an input point 1(1) and/or of a material space connected to it approaches a set limit for surface height, or when the surface height reaches a set value, the supervision means 9, such as a sensor, gives information and/or a signal, on the basis of which at least one input point can be set into a state in which it cannot receive material. Depending on the embodiment, on the basis of a signal given by a supervision means 9, the indicator means and/or signal means of the first and/or second input point can be set into a state in which the user is guided to a second input point. There can be a plurality of supervision means. According to one embodiment, a supervision means 9 can be fitted in each input point of a feed-in station. The supervision means 9 is presented in connection with one first input point 1(1) in FIG. 2a. The supervision means in the figure is presented in a simplified and diagrammatic manner. Typically, the supervision means is fitted inside the input point. A supervision means can also be arranged in a material space to which one or more input points are connected. According to one embodiment, the material space is e.g. the material space of the inlet chute.

According to one embodiment, when a user attempts to activate the first input point 1(1) into operation to accept material by using the activation means 4 of the first input point e.g. by pressing an operating switch, turning a key, proffering a remotely-readable identifier or corresponding to the activation means 4 of the input point in question, e.g. to a remote reader of the identifier, the shut-off part 3 of the input aperture of the first input point remains in the first position, i.e. with the input aperture 2 closed. In such a case, one or more indicator means and/or signal means of at least one second input point 1(2) activates into an operating state in which the user's attention is caught and/or the user is guided to move from the first input point 1(1) to the second input point 1(2) and to feed in material from the input aperture of the second input point 1(2). The operating state of such an indicator means and/or signal means can be e.g. one or more of the following: the shut-off part 3 of the input aperture 2 of the second input point 1(2) is displaced into a second position, the sound means 8 is activated to give a sound signal 7, at least one light source 5, 6 of a second input point is activated into a second operating state, e.g. to give a light signal. By changing the color of the light being shown by the first and/or second light source, a user's attention can effectively be caught and/or a user can be guided and also the different operating states of an input point can be indicated. For example, when at least one light source 5, 6 shows a red light, material cannot be fed into the input point. When a light source shows a green light, material can be fed into the input point. When the indicator means and/or signal means is a sound source 8, various sound signals 7 or other information can be given. In FIG. 2b, the sound source 8 is diagrammatically marked in connection with the wall 11 of an input point. A sound source can be arranged inside, or outside of, the envelope of an input point 1(1), 1(2), 1(3), 1(4), 1(5) ... 1(n). A sound source can be adapted to give e.g. a sound signal, a combination of sound signals, a melody or a voice sound for guiding a user. A sound source 8 can be adapted to give instructions, e.g. "Bring the rubbish here".

The indicator means and/or signal means can thus in some cases also be the shut-off part 3 of at least one second input point of the feed-in station 100, the displacement of which from the first position into the second position can give a guidance signal to a user to move for feeding in material from the input aperture of the second input point 1(2).

FIGS. 1-2 thus present five input points 1(1), 1(2), 1(3), 1(4), 1(5) side-by-side.

The input point arrangement of the feed-in station 100 according to the invention can be adapted to function as follows: When a user tries to feed material into the first input point 1(1), which cannot receive more material, the user is guided to feed material into the second input point 1(2). The user is guided to the second input point 1(2) by keeping the input aperture 2 of the first input point 1(1) closed with the shut-off part 3 and by guiding the user to the second input point 1(2) with the indicator means and/or signal means.

A user is guided to a second input point possibly also with the signal means of the first input point. A user is guided to a second input point by opening the hatch of the second input point. A user is guided to a second input point with indicator means and/or signal means arranged in the proximity of the first and/or second input point.

According to the figures, a hatch 3 is in connection with the input aperture 2 of an input point 1, which hatch is opened and closed e.g. with an operating device. When the hatch 3 is open, material can be fed via the input aperture 2 into the feed-in container 10 of an input point.

In the feed-in station 100 of FIGS. 1 and 2, the procedure can be e.g. as follows. When the first input point 1(1) intended for mixed waste is in a state in which it cannot receive material, a user is guided with the indicator means and/or signal means to a second input point 1(2) for mixed waste. FIG. 2a presents an embodiment wherein the hatch 3 of the input aperture 2 of the first input point 1(1) is closed. The activation means 4 of the shut-off part of the input aperture of the input point, such as a lock, code input panel, reader or suchlike of a remotely-readable identifier, or receiver of a signal sent with a mobile device, is activated to receive an input or identifier of the user or of a user's device. The at least one light source 5, 6 of the first input point 1(1), said source functioning as an indicator means and/or signal means, is activated into a first state. In FIG. 2a, the first light source 5 is activated to show a red light. The indicator means and/or signal means of the second input point 1(2), intended for mixed waste, has changed to an operating state in which a user is guided to bring material to the second input point 1(2) instead of to the first input point 1(1). The indicator and/or signal trying to guide a user to this action can be one or more of the following: The hatch 3 of the input aperture of the second feed-in station is opened, one or more light sources 5, 6 of the first and/or second input point is activated into a second operating state, a sound device 7 is activated. In FIG. 2b, the first light source 5 of the second input point 1(2) is activated to show a green light. The sound device 8 diagrammatically presented in FIG. 2b can be adapted to give a sound signal 7 or other information.

Although an input point arrangement is described above in connection with two input points intended for mixed waste, the first and/or second input point can be the input point for some other material category or for a number of material categories. Depending on the application site, when at least one input point for a certain material category is in a state in which it cannot receive material brought by a user, the user can be guided to a secondary input point. A secondary input point is dependent on the requirements of the application site. For example, according to one embodiment, when an input point intended for paper is in a state in which it cannot receive material, a user is guided with the indicator means and/or signal means to an input point intended for mixed waste. According to one embodiment, when an input point intended for biowaste is in a state in which it cannot receive material, a user is guided with the indicator means and/or signal means to an input point intended for mixed waste.

The embodiment of FIGS. 1-2 presents a feed-in station 100 comprising input points for four material categories. Two input points for mixed waste are presented in the feed-in station arrangement. In this case, when the first or second input point intended for mixed waste is in a state in which it cannot receive the material intended for it, the user is guided to the input point for a corresponding material category that can accept material. If this is not possible the material is guided to a secondary input point, i.e. to an input point for the type of material category that can secondarily receive the material in question. An input point intended for mixed waste can secondarily receive e.g. biowaste, paper or cardboard.

The arrangement can also be applied in connection with the type of feed-in station in which the shut-off parts of the input points are operated by hand; they are manually-operated. The shut-off part can be e.g. a hatch. The hatch can be e.g. hinged. The hatch is opened by moving it between a first position in which the input aperture 2 is at least partly closed, in which case material is not intended to be fed from the input aperture to inside the input point, and a second position in which the input aperture is open, in which second position material can be fed from the input aperture to inside the input point. A supervision means 9, e.g. a sensor, for the amount of material fed into an input point can be arranged in at least one first input point 1(1). On the basis of information and/or a signal given by at least one supervision means 9 of the material space of at least one first input point 1(1), the indication means and/or signal means can be activated to guide and/or instruct. The supervision means 9 for the amount of material in a material space can be e.g. a sensor monitoring surface height. According to one embodiment, the supervision means 9 is an ultrasound sensor measuring the amount of material. According to one embodiment, the supervision means 9 is a sensor monitoring surface height, e.g. a limit switch. At least one supervision means 9 of the material space of at least one first input point 1(1) is a supervision means of the surface height of the amount of material fed into the material space, in which case when the surface height reaches a set level the indication means and/or signal means is activated to guide and/or instruct a user to feed in material from the input aperture of at least one second input point 1(2) of the feed-in station 100. In the arrangement at least the first input point 1(1) can comprise at least one supervision means 9 of the material space, on the basis of the information/signal given by which the indication means and/or signal means of the first and/or of the second input point is adapted to be activated. At least one supervision means 9 of the material space of at least one first input point 1(1) is a supervision means of the surface height of the amount of material fed into the material space, on the basis of the information and/or signal given by which means, at least when the surface height reaches a set level the indication means and/or signal means of the first and/or second input point are adapted to be activated to guide and/or instruct a user to feed in material from the input aperture of at least one second input point 1(2) of the feed-in station 100.

With the arrangement, a situation wherein a user feeds material into a secondary input point can be achieved better than earlier. This reduces hygiene problems in the proximity of the input points. At the same time, the capacity of the system can be put to more efficient use.

In the embodiments of the figures, the invention is described by means of an input point of a feed-in station. When the invention is applied e.g. in connection with refuse chutes, there can be a number of refuse chutes side-by-side. The supervision means can be arranged in connection with the material space of an inlet chute. The supervision means can be arranged to give a signal to a number of shut-off parts of the input apertures of the input points of the chute in question. In this case the indication means and/or signal means of input points connected to the chute are set to guide and/or instruct a user to feed material into a second input point. Such an input point can be e.g. an input point that is not connected to the inlet chute in question, which chute cannot receive material. The second input point can be connected e.g. to a second inlet chute. In such a case, the user is guided/instructed to feed in material from the input aperture of the second input point 1(2), when the first inlet chute and/or the input point 1(1) connected to it is in a state in which it cannot receive material. Depending on the embodiment, a secondary input point for material to be fed in can be formed from the input points of the second inlet chute if the first inlet chute is in a state in which it cannot receive material. In this case a user can be guided/instructed to an input point suitable for the material intended to be fed in. It can also be conceived that, if the situation so requires, an input point suitable for material to be fed in e.g. temporarily can be made from one or more input points and/or inlet chutes. although it would normally be intended for other material.

The invention thus relates to a method for guiding and/or instructing in a feed-in station 100 of a material conveying system, which feed-in station comprises at least one first input point 1(1) and at least one second input point 1(2), which input points 1(1), 1(2) each comprise at least one input aperture 2 and a shut-off part 3 of the input aperture, which shut-off part is movable between a first position, in which the input aperture 2 is at least partly closed, in which case material is not intended to be fed from an input aperture to inside an input point, and a second position in which the input aperture is open, in which second position material can be fed from the input aperture to inside the input point. The first input point 1(1) and/or the second input point 1(2) is adapted to comprise indication means and/or signal means, with which in the method a user is guided and/or instructed to feed in material from the input aperture of the second input point 1(2) of the feed-in station 100, when the first input point 1(1) is in a state in which it cannot receive material.

According to one embodiment, the shut-off part 3 of the input aperture of the first and/or second input point is adapted to function as an indication means and/or signal means.

According to one embodiment, at least one light source 5, 6 of the first and/or second input point is adapted to function as an indication means and/or signal means.

According to one embodiment, at least one sound source 8 of the first and/or second input point is adapted to function as an indication means and/or signal means.

According to one embodiment, in the method the indication means and/or signal means are activated to guide and/or instruct with the activation means 4 of the first input point.

According to one embodiment, in the method the indication means and/or signal means are activated to guide and/or instruct on the basis of information and/or a signal given by at least one supervision means 9 of at least the first input point 1(1), or of the material space connected to said input point.

According to one embodiment, in the method at least one supervision means 9 of at least one first input point 1(1), or of the material space connected to said input point, is a supervision means of the surface height of the amount of material fed into the input point or into the material space connected thereto, in which case when the surface height reaches a set level the indication means and/or signal means is activated to guide and/or instruct a user to feed in material from the input aperture of at least one second input point 1(2) of the feed-in station 100.

According to one embodiment, in the method when it is attempted in the method to activate the first input point 1(1) with the activation means 4 of the first input point into operation to accept material, the shut-off part 3 of the second input point 1(2) is released for displacing said part into the second position and/or the shut-off part 3 of the second input point 1(2) is displaced into a second position.

According to one embodiment, in the method when it is attempted in the method to activate the first input point 1(1) with the activation means 4 of the first input point into operation to accept material, the shut-off part 3 of the input aperture of the first input point is kept in the first position, i.e. the feed aperture 2 is at least partly closed.

According to one embodiment, at least one light source 5, 6 of the second input point 1(2) is activated to show the active state of the feed-in station.

According to one embodiment, at least one sound source 8 of the first and/or second input point is activated into a state in which the user is guided to the second feed-in station.

According to one embodiment, in the method a user is instructed by activating a second input point 1(2) that is intended for the same material category as the first input point 1(1)), or which second input point is a secondary input point for the material category intended for the first input point.

According to one embodiment, in the method the shut-off part 3 of at least the first input point 1(1) is manually operated.

According to one embodiment, in the method the first input point is set into a state in which it cannot receive material on the basis of information/signal given by the supervision means 9 of an input point or of a material space connected to it, and/or because of the emptying of the input point or of a material space connected to it, and/or on the basis of a malfunction or other interruption of operation.

The object of the invention is also an input point arrangement in a feed-in station 100, which feed-in station comprises at least one first input point 1(1) and one second input point 1(2), which input points 1(1), 1(2) each comprise at least one input aperture 2 and a shut-off part 3 of the input aperture, which shut-off part is movable between a first position in which the input aperture is closed, in which case material cannot be fed from the input aperture to inside the input point, and a second position in which the input aperture is open, in which second position material can be fed from the input aperture to inside the input point. The first input point 1(1) and/or the second input point 1(2) is adapted to comprise indication means and/or signal means, with which a user is guided and/or instructed to feed in material from the input aperture of the second input point 1(2) of the feed-in station 100, when the first input point 1(1) is in a state in which it cannot receive material.

According to one embodiment, the shut-off part 3 of the input aperture of the first and/or second input point is adapted to function as an indication means and/or signal means.

According to one embodiment, at least one light source 5, 6 of the first and/or second input point is adapted to function as an indication means and/or signal means.

According to one embodiment, at least one sound source 8 of the first and/or second input point is adapted to function as an indication means and/or signal means.

According to one embodiment, in the arrangement at least one first input point 1(1) and/or the material space connected to it comprises at least one supervision means 9, on the basis of the information/signal given by which supervision means the indication means and/or signal means of at least one first and/or one second input point is adapted to be activated.

According to one embodiment, at least one supervision means 9 of at least one first input point 1(1), and/or of the material space connected to said input point, is a supervision means of the surface height of the amount of material fed into the material space, on the basis of the information and/or signal given by which means, at least when the surface height reaches a set level, the indication means and/or signal means of at least one first and/or at least one second input point is adapted to be activated to guide and/or instruct a user to feed in material from the input aperture of at least one second input point 1(2) of the feed-in station 100.

According to one embodiment, the shut-off part 2 of the input aperture of the first input point 1(1) is kept in the first position.

According to one embodiment, in the arrangement activation of the activation means 4 of the first input point 1(1) is adapted to bring about activation of the indication means and/or signal means of a second input point 1(2) and/or of a first input point to guide or instruct to the second input point 1(2).

According to one embodiment, in the arrangement activation of the activation means 4 of the first input point 1(1) is adapted to bring about release of the shut-off part 3 of the second input point 1(2) for displacing said part into a second position and/or displacement of the shut-off part 3 of the second input point 1(2) into a second position.

According to one embodiment, the activation means 4 of an input point is the opening apparatus and/or locking apparatus, or part thereof, of the shut-off part 3.

According to one embodiment, the activation means 4 is e.g. a switch, lock, code input panel, reader of a remotely-readable identifier or receiver of a signal sent with a mobile device, which means is connected to the operating system of the feed-in station.

According to one embodiment, the activation means 4 is adapted to displace the shut-off part 3 into a second state, e.g. by giving a command to the actuator and/or locking device of the shut-off part 3.

According to one embodiment, the activation means 4 is a reader of a remotely-readable identifier.

According to one embodiment, the shut-off part 3 is adapted to be manually operated.

According to one embodiment, at least one first input point is adapted to be set into a state in which it cannot receive material on the basis of information and/or a signal given by the supervision means 9 of an input point or of a material space connected to it, and/or because of the emptying of the input point or of a material space connected to it, and/or on the basis of a malfunction or other interruption of operation.

The invention also relates to a waste conveying system, which comprises an input point arrangement according to any of the aforementioned characteristic features.

Typically, the material is waste material, such as waste material arranged in bags. The input point can be adapted to be a part of a pneumatic waste conveying system or it can be a separate part, in which waste material is conducted into the waste room, waste container or corresponding.

It is obvious to the person skilled in the art that the invention is not limited to the embodiments presented above, but that it can be varied within the scope of the claims presented below. The characteristic features possibly presented in the description in conjunction with other characteristic features can also, if necessary, be used separately to each other.

The invention claimed is:

1. A method for guiding and/or instructing in a feed-in station of a material conveying system, the feed-in station comprising at least one first input point and at least one second input point, the input points each comprising at least one input aperture and a shut-off part of the input aperture, the shut-off part being movable between a first position in which the input aperture is at least partly closed, in which case material is not intended to be fed from the input aperture to inside the input point, and a second position in which the input aperture is open, in which material can be fed from the input aperture to inside the input point, wherein the first input point and/or the second input point is adapted to comprise an indicator and/or a signal, said method comprising:
    detecting that an amount of material in the first input point exceeds a predetermined amount;
    maintaining the shut-off part of the input aperture of the first input point in the first position when the amount of material in the first input point exceeds a predetermined amount; and
    guiding a user and/or instructing a user to feed in material from the input aperture of the second input point of the feed-in station.

2. The method according to claim 1, wherein the shut-off part of the input aperture of the first and/or second input point is adapted to function as the indicator and/or signal.

3. The method according to claim 1, wherein at least one light source of the first and/or second input point is adapted to function as the indicator and/or signal.

4. The method according to claim 1, wherein at least one sound source of the first and/or second input point is adapted to function as the indicator and/or signal.

5. The method according to claim 1, comprising activating the indicator and/or signal to guide and/or instruct with an activation mechanism of the first input point.

6. The method according to claim 1, further comprising activating the indicator and/or signal to guide and/or instruct on the basis of information and/or a signal given by at least one sensor of at least the first input point, or of the material space connected to said input point.

7. The method according to claim 1, wherein at least one sensor of at least one first input point, or of the material space connected to said input point, is of sensing the surface height of the amount of material fed into the input point or into the material space connected thereto, in which case when the surface height reaches a set level the indicator and/or signal is activated to guide and/or instruct a user to feed in material from the input aperture of at least one second input point of the feed-in station.

8. The method according to claim 1, wherein when in the method it is attempted to activate the first input point with an activation mechanism of the first input point into operation to accept material, the shut-off part of the second input point is displaced into the second position.

9. The method according to claim 1, wherein when in the method it is attempted to activate the first input point with an activation mechanism of the first input point into operation to accept material, the shut-off part of the input aperture of the first input point is kept in the first position.

10. The method according to claim 1, wherein at least one light source of the second input point is activated to show the active state of the feed-in station.

11. The method according to claim 1, wherein at least one sound source of the first and/or second input point is activated into a state in which the user is guided to the second feed-in station.

12. The method according to claim 1, wherein in the method a user is instructed by activating a second input point that is intended for the same material category as the first input point, or which second input point is a secondary input point for the material category intended for the first input point.

13. The method according to claim 1, wherein in the method the shut-off part of at least the first input point is manually operated.

14. The method according to claim 1, wherein in the method the first input point is set into a state in which the first input point cannot receive material on the basis of information or a signal given by the sensor of an input point or of a material space connected to the input point, and/or because of the emptying of the input point or of a material space connected to the input point, and/or on the basis of a malfunction or other interruption of operation.

15. An input point arrangement in a feed-in station, the feed-in station comprising:
at least one first input point and one second input point,
a sensor for determining an amount of material in the first input point,
wherein each input point comprises at least one input aperture and a shut-off part of the input aperture, the shut-off part being movable between a first position in which the input aperture is closed, in which case material cannot be fed from the input aperture to inside the input point, and a second position in which the input aperture is open, in which second position material can be fed from the input aperture to inside the input point,
wherein the shut-off part of the input aperture is maintained in the first position when the amount of material in the first input point exceeds a predetermined amount, and
wherein the first input point and/or the second input point is adapted to comprise an indicator and/or signal with which a user is guided and/or instructed to feed in material from the input aperture of the second input point of the feed-in station, when the shut-off part of the input aperture of the first input point is maintained in the first position.

16. The input point arrangement according to claim 15, wherein the shut-off part of the input aperture of the first and/or second input point is adapted to function as the indicator and/or signal.

17. The input point arrangement according to claim 15, wherein at least one light source of the first and/or second input point is adapted to function as the indicator and/or signal.

18. The input point arrangement according to claim 15, wherein at least one sound source of the first and/or second input point is adapted to function as the indicator and/or signal.

19. The input point arrangement according to claim 15, wherein on the basis of the information/signal given by the sensor, the indicator and/or signal of at least one first and/or of one second input point is adapted to be activated.

20. The input point arrangement according to claim 15, the sensor is a sensor of the surface height of the amount of material fed into the material space, and wherein on the basis of the information and/or signal given by the sensor, at least when the surface height reaches a set level, the indicator and/or signal of at least one first and/or at least one second input point is adapted to be activated to guide and/or instruct a user to feed in material from the input aperture of at least one second input point of the feed-in station.

21. The input point arrangement according to claim 15, wherein the shut-off part of the input aperture of the first input point is kept in a first position.

22. The input point arrangement according to claim 15, wherein in the arrangement, activation of an activation mechanism of the first input point is adapted to bring about activation of the indicator and/or signal of the second input point and/or of the first input point to guide or instruct to the second input point.

23. The input point arrangement according to claim 15, wherein in the arrangement, activation of an activation mechanism of the first input point is adapted to bring about release of the shut-off part of the second input point for displacing said part into a second position and/or to bring about displacement of the shut-off part of the second input point into a second position.

24. The input point arrangement according to claim 15, wherein an activation mechanism of an input point is the opening apparatus and/or locking apparatus, or part thereof, of the shut-off part.

25. The input point arrangement according to claim 15, wherein an activation mechanism is a switch, lock, code input panel, reader of a remotely-readable identifier, or receiver of a signal sent with a mobile device, the activation means being connected to the operating system of the feed-in station.

26. The input point arrangement according to claim 15, wherein an activation mechanism is adapted to displace the shut-off part into a second state.

27. The input point arrangement according to claim 15, wherein an activation mechanism is a reader of a remotely-readable identifier.

28. The input point arrangement according to claim 15, wherein the shut-off part is adapted to be manually operated.

29. The input point arrangement according to claim 15, wherein at least one first input point is adapted to be set into a state in which the at least one first input point cannot receive material on the basis of the information/signal given by sensor of an input point or of a material space connected to the input point, and/or because of the emptying of the input point or of a material space connected to the input point, and/or on the basis of a malfunction or other interruption of operation.

30. A waste conveying system, comprising the input point arrangement according to claim 15.

* * * * *